(12) United States Patent
Ragazzi (10) Patent No.: US 9,823,009 B2
(45) Date of Patent: Nov. 21, 2017

(54) METHOD AND SYSTEM FOR DE-ICING A HEAT EXCHANGER

(71) Applicant: Ford Global Technologies, LLC, Dearborn, MI (US)

(72) Inventor: Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 599 days.

(21) Appl. No.: 14/212,283

(22) Filed: Mar. 14, 2014

(65) Prior Publication Data

US 2015/0260442 A1    Sep. 17, 2015

(51) Int. Cl.
*F25D 21/08*   (2006.01)
*B60H 1/32*    (2006.01)
*B60H 1/00*    (2006.01)

(52) U.S. Cl.
CPC ............ *F25D 21/08* (2013.01); *B60H 1/321* (2013.01); *B60H 2001/00949* (2013.01)

(58) Field of Classification Search
CPC ....... B60H 1/321; B60H 1/0785; F25D 21/08; B60L 7/22; B60L 1/02
See application file for complete search history.

(56) References Cited

U.S. PATENT DOCUMENTS

| | | | | |
|---|---|---|---|---|
| 4,432,211 A | * | 2/1984 | Oishi | G05D 23/2401 219/497 |
| 4,866,365 A | * | 9/1989 | Offiler | B60L 1/02 322/8 |
| 5,507,153 A | * | 4/1996 | Seto | B60H 1/00392 188/159 |
| 5,983,656 A | * | 11/1999 | Tokumasu | B60H 1/321 165/240 |
| 6,040,561 A | * | 3/2000 | Murty | B60H 1/00392 219/494 |
| 6,467,284 B1 | * | 10/2002 | Chen | F25B 43/006 62/156 |
| 6,989,644 B2 | * | 1/2006 | Kim | B60L 1/02 180/65.1 |
| 7,789,179 B2 | | 9/2010 | Steiner et al. | |

(Continued)

FOREIGN PATENT DOCUMENTS

DE   102011090195 A1   7/2013
EP   2497662 A2        9/2012

(Continued)

OTHER PUBLICATIONS

JP 2013208938 Abstract Translation.*

(Continued)

*Primary Examiner* — Frantz Jules
*Assistant Examiner* — Nelson Nieves
(74) *Attorney, Agent, or Firm* — David Kelley; McCoy Russell LLP (57) ABSTRACT

Methods and systems for de-icing an exterior heat exchanger of a vehicle's heat pump are presented. In one example, a positive temperature coefficient (PTC) heater provides heat to refrigerant that de-ices the exterior heat exchanger. In some examples, an additional PTC heater provides heat to engine coolant to warm a vehicle's passenger cabin when the vehicle's exterior heat exchanger is being de-iced.

6 Claims, 6 Drawing Sheets

(56) References Cited

U.S. PATENT DOCUMENTS

| | | | |
|---|---|---|---|
| 2006/0046895 A1* | 3/2006 | Thacher | B60L 7/26 477/4 |
| 2008/0196429 A1* | 8/2008 | Petrenko | F25D 21/08 62/207 |
| 2008/0202722 A1* | 8/2008 | Feuerecker | B60H 1/00907 165/41 |
| 2011/0031937 A1* | 2/2011 | Bito | B60L 1/02 320/150 |
| 2011/0109157 A1 | 5/2011 | Tani | |
| 2011/0197605 A1* | 8/2011 | Suzuki | B60H 1/00335 62/140 |
| 2012/0094509 A1* | 4/2012 | Bryan | B60Q 11/005 439/76.1 |
| 2012/0173062 A1* | 7/2012 | Madurai Kumar | B60W 10/06 701/22 |
| 2012/0179329 A1* | 7/2012 | Okamoto | B60H 1/00735 701/36 |
| 2012/0205088 A1* | 8/2012 | Morisita | B60H 1/00921 165/202 |
| 2012/0304622 A1* | 12/2012 | Verbrugge | B60W 10/30 60/274 |
| 2013/0076314 A1* | 3/2013 | Nagakura | H01M 10/44 320/162 |
| 2013/0099561 A1* | 4/2013 | Raman | B60L 1/02 307/9.1 |
| 2013/0111932 A1* | 5/2013 | Mishima | F25B 29/00 62/79 |
| 2014/0114513 A1* | 4/2014 | Treharne | B60W 10/06 701/22 |
| 2014/0298838 A1* | 10/2014 | Morishita | B60H 1/321 62/151 |
| 2014/0352277 A1* | 12/2014 | Silvers | F01N 9/002 60/274 |
| 2015/0121930 A1* | 5/2015 | Kasuya | B60H 1/00921 62/238.6 |
| 2015/0158366 A1* | 6/2015 | Lee | B60H 1/2218 701/36 |
| 2016/0025404 A1* | 1/2016 | Zheng | F25D 21/04 62/80 |
| 2016/0075214 A1* | 3/2016 | Hamamoto | B60H 1/3205 62/160 |

FOREIGN PATENT DOCUMENTS

| | | |
|---|---|---|
| EP | 2636548 A1 | 9/2013 |
| JP | 2013208938 A * | 10/2013 |
| WO | 2011016264 A1 | 2/2011 |
| WO | 2013094144 A1 | 6/2013 |

OTHER PUBLICATIONS

Smith, Mark G. et al., "Climate Control System," U.S. Appl. No. 14/010,056, filed Aug. 26, 2013, 14 pages.

Ragazzi, Franco, "Method and System for Heating a Vehicle," U.S. Appl. No. 14/143,324, filed Dec. 30, 2013, 37 pages.

"Heat for every drive concept: Eberspaecher supplies efficient systems for electric and hybrid cars," Public Relations Eberspächer Group, http://www.eberspaecher.com/nc/en/press/press-releases/individual-view/article/heat-for-every-drive-concept-eberspaecher-supplies-efficient-systems-forelectric-and-hybrid-cars/419.html, Updated Jan. 18, 2013, pp. 1-4.

PCT Heating Systems for Vehicle Body Manufacturers and Small OEMs, Eberspächer Climate Control Systems GmbH & Co. KG, Version Sep. 2013, 8 pages.

"PCT Heater for Electric Vehicles and Plug-in Hybrid Vehicles Using Water Heat Carrier," Mitsubishi Heavy Industries Technical Review, vol. 46, No. 4, pp. 19-21, Dec. 2010, 3 pages.

* cited by examiner

METHOD AND SYSTEM FOR DE-ICING A HEAT EXCHANGER

FIELD

The present description relates to methods and systems for de-icing an outside evaporator of a vehicle having a heat pump. The methods and systems may be particularly useful for vehicles that are solely electrically propelled or vehicles that may include a motor and an engine for propulsion.

BACKGROUND AND SUMMARY

A passenger vehicle may include a heat pump to warm and cool a passenger cabin. In some examples, the heat pump may heat the passenger cabin by first transferring heat from a refrigerant to engine coolant. The engine coolant is then directed to a heater core in the passenger cabin where passenger cabin air passes over the heater core to heat the passenger cabin. However, if an exterior heat exchanger of the heat pump experiences icing, the passenger cabin may not reach a desired temperature because of inefficient heat pump operation. The exterior heat exchanger may be de-iced by passing warm refrigerant through the heat exchanger. One way to warm the refrigerant is to operate the heat pump in cooling mode, where the exterior heat exchanger operates as a condenser. However, operating the heat pump in a cooling mode removes heat from the passenger cabin at a time when the driver may require heat. As a result, passenger cabin temperature may be reduced or it may not reach a desired temperature in a desired amount of time.

The inventor herein has recognized the above-mentioned disadvantages and has developed a method for thawing a vehicle's exterior heat exchanger, comprising: increasing an opening amount of an expansion valve located along a passage between a compressor and an exterior heat exchanger in response to exterior heat exchanger icing; and activating a first positive temperature coefficient (PTC) heater in response to the exterior heat exchanger icing, the PTC heater in thermal communication with refrigerant passing through the expansion valve.

By heating refrigerant of a vehicle's heat pump using a PTC heater, it may be possible to provide the technical result of more rapidly de-icing a vehicle's exterior heat exchanger while not removing heat from the passenger cabin. Consequently, it may be possible to increase passenger cabin heat in less time. For example, the vehicle's heat pump may enter a de-icing mode where an expansion valve supplying refrigerant to the exterior heat exchanger is nearly fully open, while at the same time, PTC heaters increase refrigerant temperature further so that exterior heat exchanger de-icing may complete sooner. The expansion valve is adjusted to maximize heat transfer to the exterior heat exchanger from the compressor and the PTC heaters. In this way, exterior heat exchanger de-icing may be expedited without removing heat from the passenger cabin.

The present description may provide several advantages. For example, the approach may improve passenger cabin heating of electric and hybrid vehicles. Further, the approach may improve heat pump efficiency. Further still, the approach may improve a vehicle's electric propulsion range when the heat pump is activated by using energy from regenerative braking to defrost the exterior heat exchanger.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
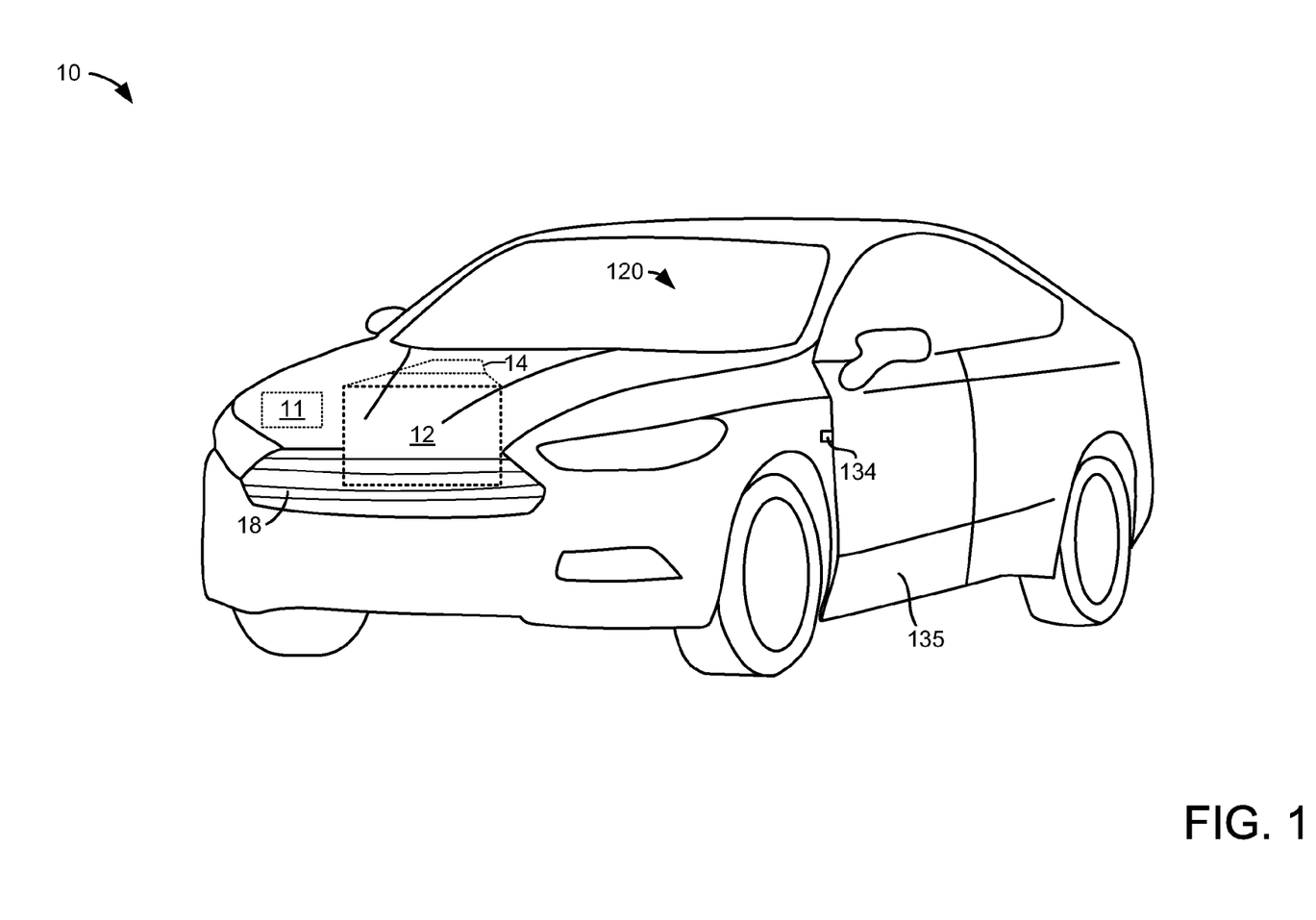
FIG. 1 is a schematic diagram of a vehicle.
Figure 2:
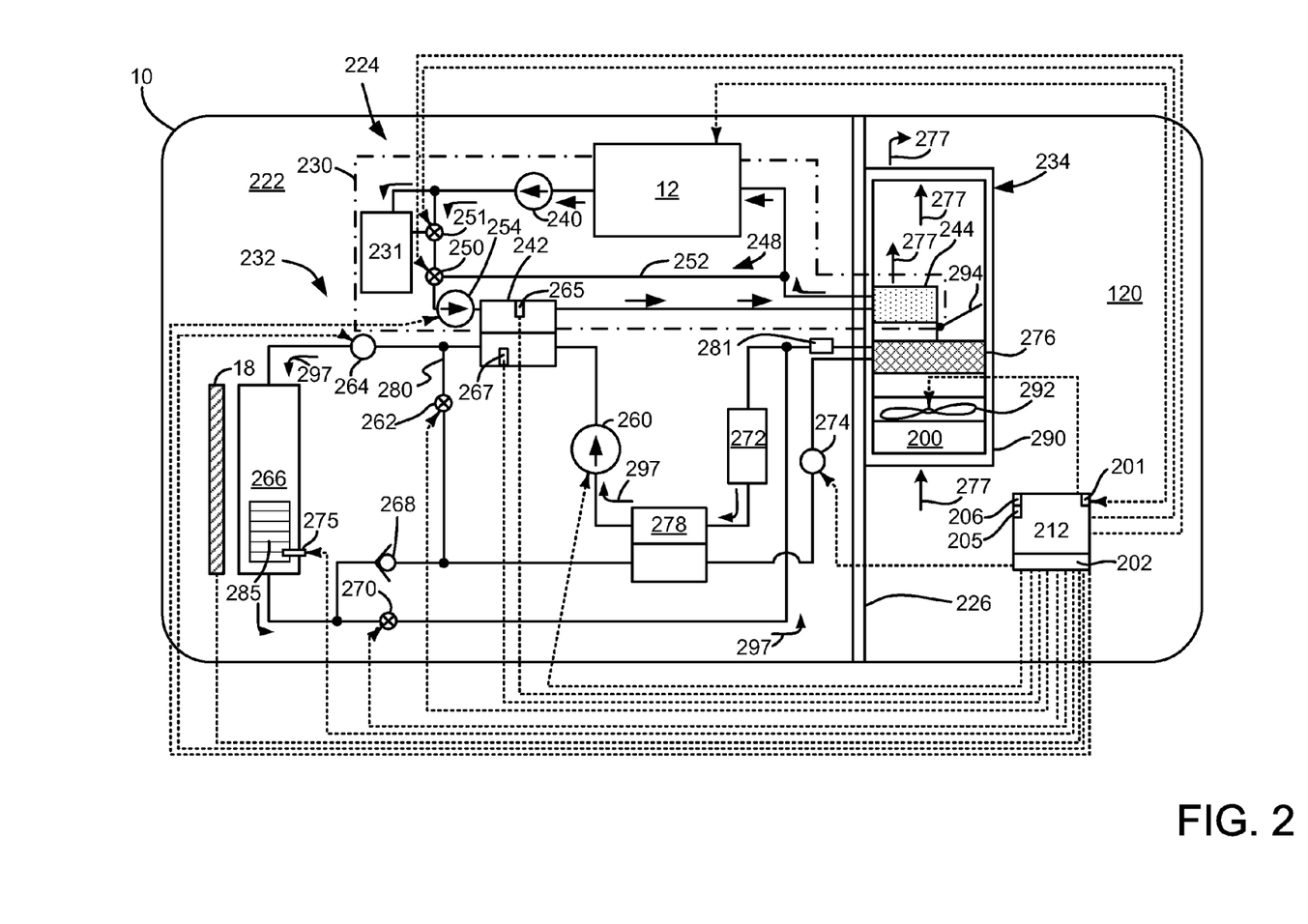
FIG. 2 shows an example vehicle heating system for the vehicle of FIG. 1.
Figure 3:
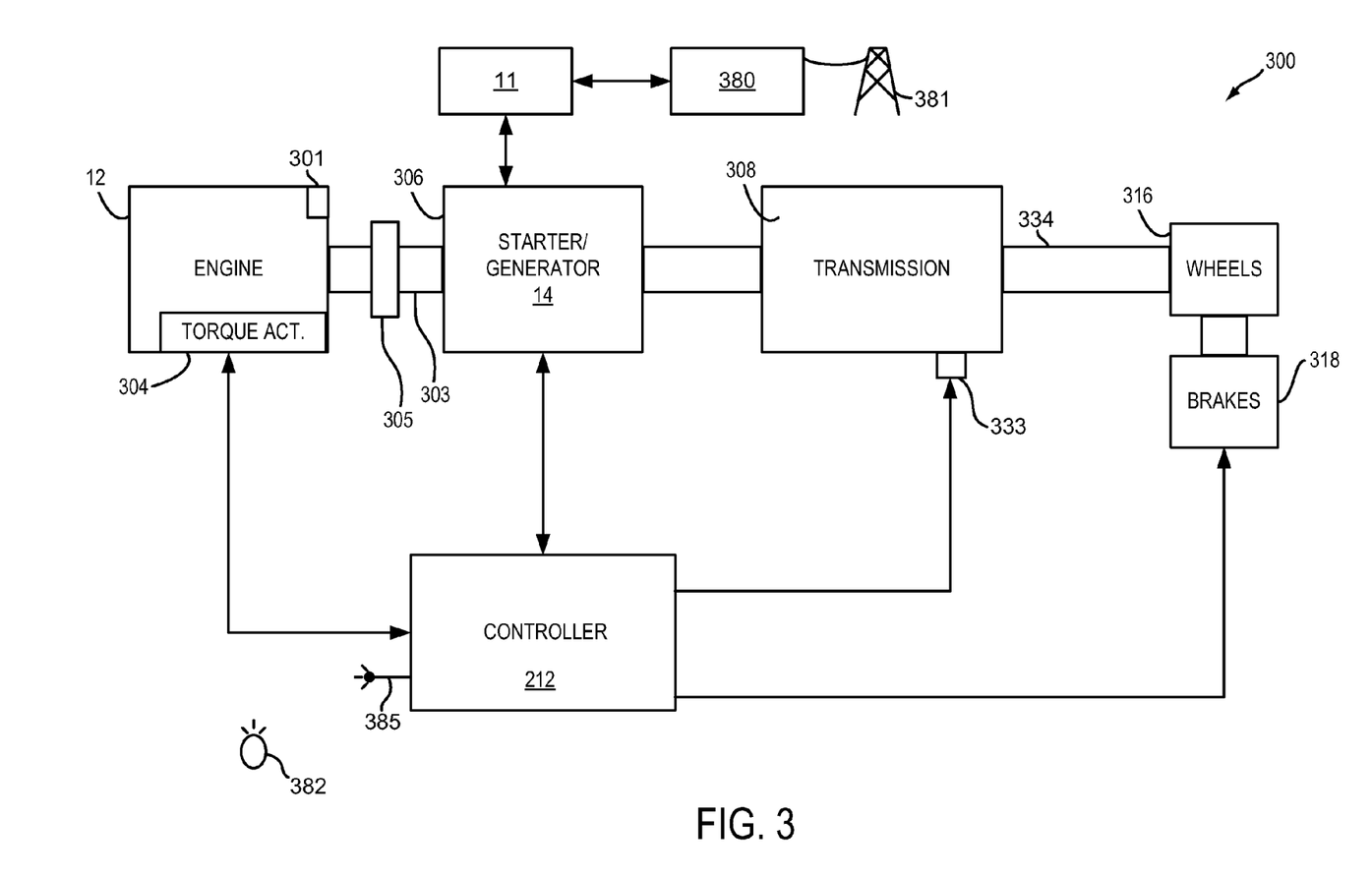
FIG. 3 shows an example vehicle driveline for the vehicle of FIG. 1.
Figure 5:
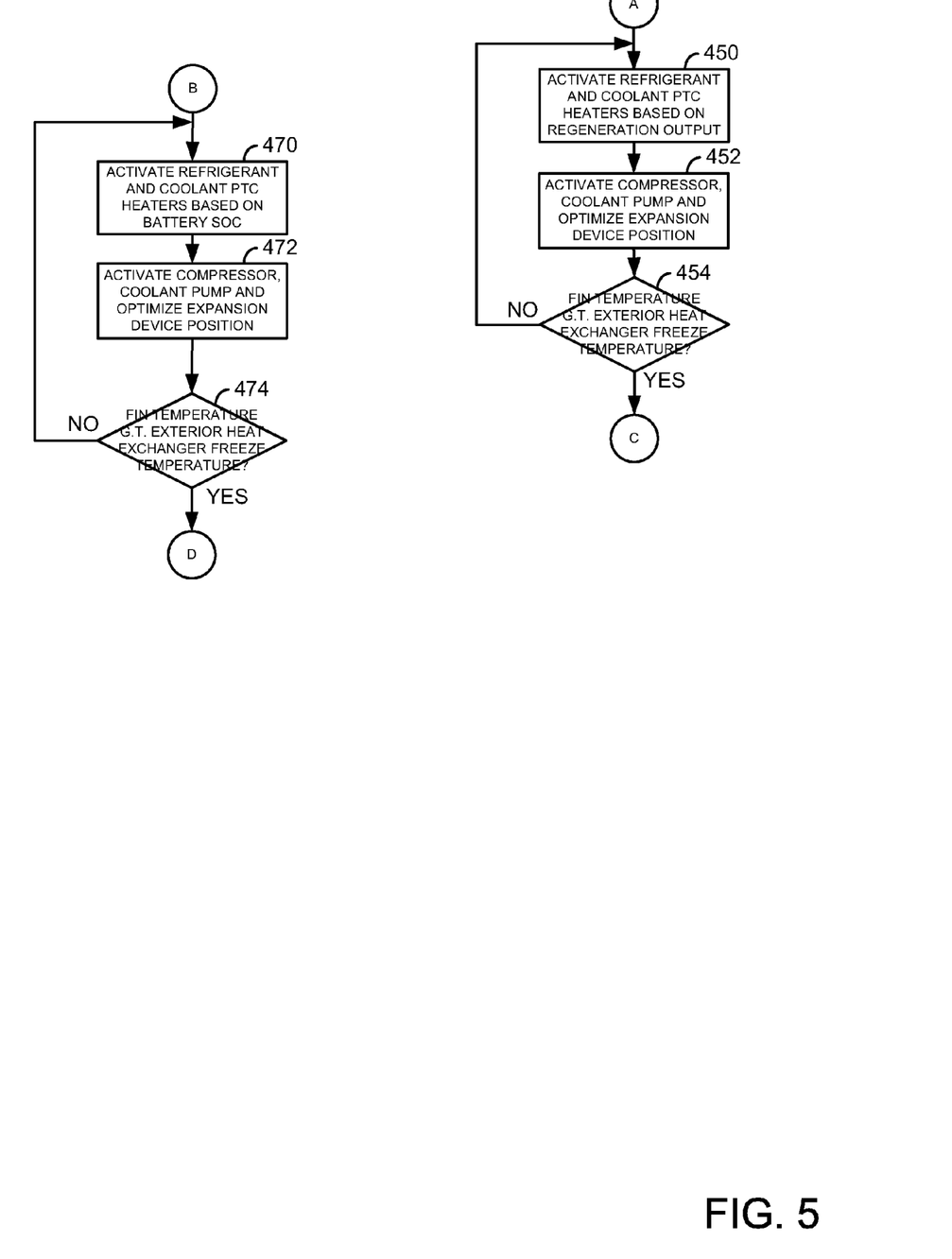
Figure 6:
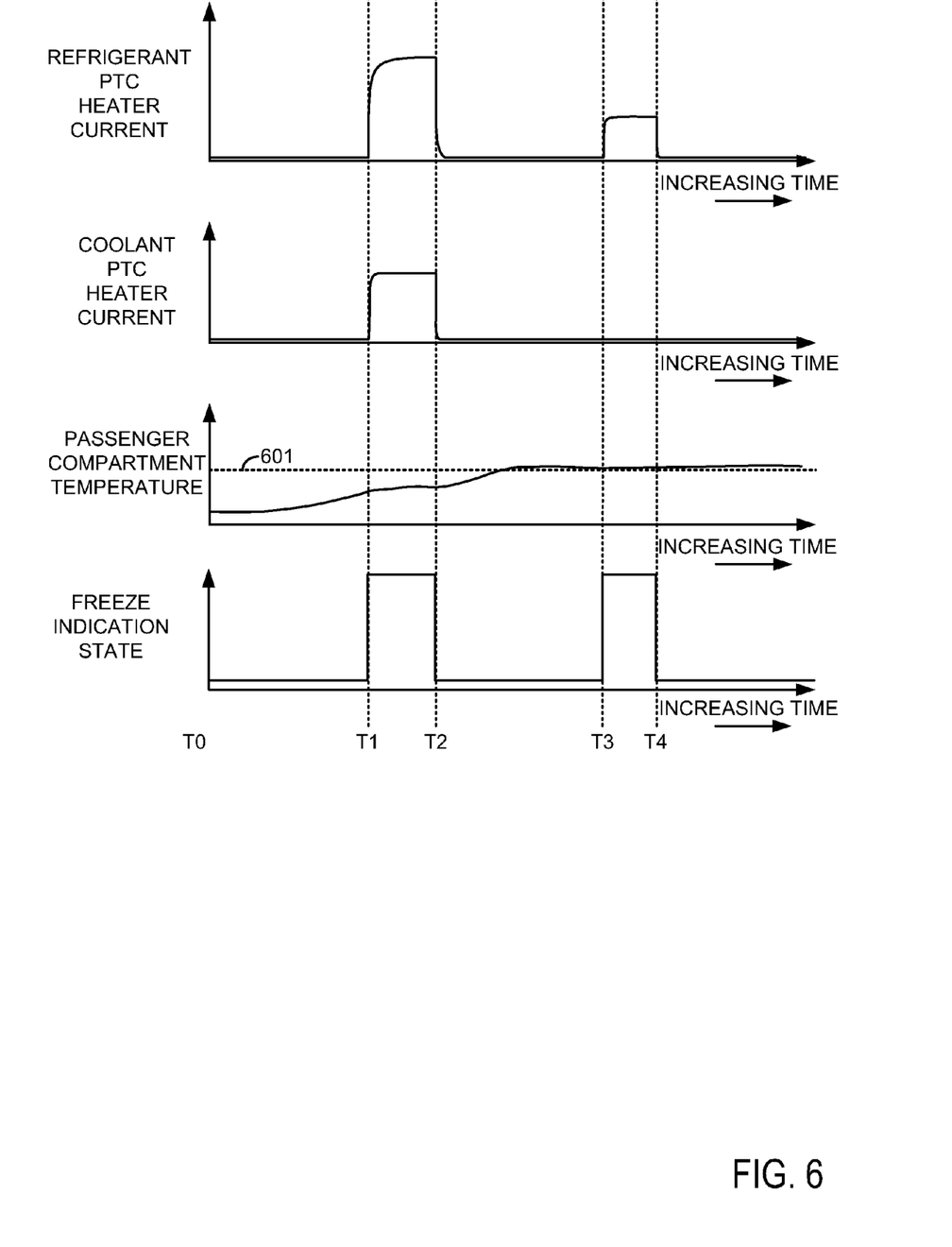
FIG. 6 shows a simulated example sequence for operating a vehicle heating system according to the method of FIGS. 4 and 5.

The present description is related to improving de-icing of a vehicle's exterior heat exchanger. Specifically, one or more PTC heaters may be installed on a refrigerant side of a refrigerant to engine coolant heat exchanger to increase refrigerant temperature so that de-icing of a heat pump's exterior heat exchanger may be timelier. The vehicle may be a passenger vehicle as is shown in FIG. 1 or a commercial vehicle (not shown). The vehicle includes a climate control system including a heat pump as is shown in FIG. 2. The climate control system may include an engine that is part of a hybrid powertrain as is shown in FIG. 3. Exterior heat exchanger de-icing may be provided according to the method of FIGS. 4 and 5. The exterior heat exchanger may be de-iced as shown in the sequence of FIG. 6 according to the method of FIGS. 4 and 5.

Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine may be supplied electrical power via the electrical energy storage device 11. The electrical energy storage device 11 may be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device. Vehicle 10 may also include adjustable grille shutters 18 for selectively allowing air to flow into the vehicle's engine compartment.

Vehicle 10 also includes door 135 that may be opened and closed to allow a driver and/or passenger to enter the vehicle cabin or passenger compartment 120. Door switch 134 provides an indication whether door 135 is open or closed. Vehicle systems such as the heat pump system shown in FIG. 2 may be activated or deactivated in response to whether or not door 135 is open or closed after a request for remotely starting the vehicle. For example, the heat pump shown in FIG. 2 may exit a cabin warming mode or a de-icing mode when a driver opens door 135.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment or cabin 120, an engine compartment 222, and a climate control system 224. The passenger compartment 120 may be within vehicle 10 and it may receive one or more occupants. A portion of climate control system 224 may be positioned in passenger compartment 120.

Engine compartment 222 may be positioned proximate to passenger compartment 120. One or more power sources, such as internal combustion engine 12, as well as a portion of climate control system 224 may be within engine compartment 222. Engine compartment 222 may be isolated from the passenger compartment 120 via bulkhead 226. The climate control system 224 may circulate air and/or control or modify the temperature of air that is circulated in the passenger compartment 120. Further, the internal combustion engine 12 may be heated via climate control system 224 to reduce fuel consumption and emissions. The climate control system 224 may include a coolant subsystem 230, a heat pump subsystem 232, and a ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, an intermediate heat exchanger 242, electrically activated positive temperature coefficient (PTC) heater 265 incorporated into intermediate heat exchanger 242 and submerged in or proximate to engine coolant on the engine coolant loop side of intermediate heat exchanger 242, a heater core 244, and a bypass loop 248 that may be fluidly interconnected by conduits or passages such as tubes, hoses, pipes, or the like. The coolant subsystem 230 includes radiator 231 for transferring thermal energy to the ambient air surrounding the vehicle 10. Coolant subsystem 230 also includes electrically operated valves 250 and 251 for adjusting coolant flow through engine 12, radiator 231, and intermediate heat exchanger 242. Electrically operated valves 250 and 251 are selectively operated via controller 212.

The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. For example, when the climate control system 224 is in a heating mode, coolant may be routed from the coolant pump 240 to the intermediate heat exchanger 242, bypassing radiator 231, and then to the heater core 244 before returning to the internal combustion engine 12 as represented by the arrowed lines. When internal combustion engine 12 is outputting a higher level of thermal energy, coolant may flow from pump 240 to radiator 231 before returning to internal combustion engine 12 via intermediate heat exchanger 242 and heater core 244. Electrically operated valve 251 directs coolant from pump 240 through radiator 231 or around radiator 231 and to electrically operated valve 250. Coolant may flow through or around engine 12 based on the position of electrically actuated valve 250.

The intermediate heat exchanger 242 may facilitate the transfer of thermal energy between the coolant subsystem 230 and the heat pump subsystem 232. In particular, heat may be transferred from heat pump subsystem 232 to coolant subsystem 230. The intermediate heat exchanger 242 may be part of the coolant subsystem 230 and the heat pump subsystem 232. The intermediate heat exchanger 242 may have any suitable configuration. For example, the intermediate heat exchanger 242 may have a plate-fin, tube-fin, or tube-and-shell configuration that may facilitate the transfer of thermal energy from heat pump subsystem 232 to coolant subsystem 230 without mixing or exchanging the heat transfer fluids in the coolant subsystem 230 and heat pump subsystems 232. Heat may be transferred from the heat pump subsystem 232 to the coolant via the intermediate heat exchanger 242 when the climate control system 224 is in a heating mode. Intermediate heat exchanger 242 includes an integral electrically operated positive temperature coefficient (PTC) heater 265 on the engine coolant side of intermediate heat exchanger 265. PTC heater 265 heater transfers heat to engine coolant without having to first transfer heat to the refrigerant. Intermediate heat exchanger 242 also includes a refrigerant side PTC heater 267. PTC heater 267 transfers heat to refrigerant without having to first transfer heat to engine coolant. PTC heaters may be activated via controller 12 supplying current to PTC heaters in response to a request to heat cabin 120 and/or a request to heat internal combustion engine 12. PTC heater 267 may also be activated by supplying current to PTC heater 267 in response to icing of exterior heat exchanger 266.

The heater core 244 may transfer thermal energy from the engine coolant to air in the passenger compartment 120. The heater core 244 may be positioned in the passenger compartment 120 in the ventilation subsystem 234 and may have any suitable configuration. For example, the heater core 244 may have a plate-fin or tube-fin construction in one or more examples.

The bypass loop 248 may route coolant such that the coolant is not heated by the internal combustion engine 12. A bypass loop control valve 250 may control the flow of coolant through the bypass loop 248. More specifically, the bypass loop control valve 250 may permit coolant to flow through a bypass line 252 and inhibit the flow of coolant from internal combustion engine 12 to the intermediate heat exchanger 242 when in a first position. In such a position, a second coolant pump 254 may circulate coolant through the bypass loop 248 from the intermediate heat exchanger 242 to the heater core 244 to the bypass line 252 and back to the second coolant pump 254. As such, the coolant in the coolant subsystem 230 may be heated independently by the heat pump subsystem 232 via the intermediate heat exchanger 242, or PTC heaters 265, or via the intermediate heat exchanger 242 and PTC heaters 265 in some operation modes. The bypass loop control valve 250 may also inhibit the flow of coolant through the bypass line 252 when in a second position. The second coolant pump 254 may or may not circulate coolant when coolant does not flow through the bypass line 252.

The heat pump subsystem 232 may transfer thermal energy to or from the passenger compartment 120 and to or from the coolant subsystem 230. In at least one example, the heat pump subsystem 232 may be configured as a vapor compression heat pump subsystem in which a fluid is circulated through the heat pump subsystem 232 to transfer thermal energy to or from the passenger compartment 120. The heat pump subsystem 232 may operate in various modes, including, but not limited to a cooling mode and a heating mode. In the cooling mode, the heat pump subsystem 232 may circulate a heat transfer fluid, which may be called a refrigerant, to transfer thermal energy from inside the passenger compartment 120 to outside the passenger compartment 120. In a heating mode, the heat pump subsystem 232 may transfer thermal energy from the refrigerant to the coolant via the intermediate heat exchanger 242 without circulating the refrigerant through a heat exchanger in the passenger compartment 120.

In heating mode, heat pump subsystem 232 may include a pump or compressor 260, a first control valve 262, a first expansion device 264, an exterior heat exchanger 266, a second control valve 268, a third control valve 270, an accumulator 272, a second expansion device 274, an interior heat exchanger 276, a pressure regulator 281, and an optional internal heat exchanger 278. Components of the heat pump subsystem 232 may be in fluidic communication via one or more conduits, such as a tube, hose or the like. In FIG. 2, the refrigerant circulation path when in the heating mode is represented by the arrowed lines 297.

Grille shutters 18 may be selectively opened and closed to reduce the aerodynamic drag of vehicle 10. Grille shutters 18 may also selectively allow air to flow over or through exterior heat exchanger 266. A temperature of the fins 285 of exterior heat exchanger 266 may be determined via temperature sensor 275 or estimated from vehicle operating conditions.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. In a heating mode, the pump 260 may provide high pressure refrigerant to the intermediate heat exchanger 242, which in turn may transfer heat from the high pressure refrigerant to coolant passing through the intermediate heat exchanger 242 to heat coolant flowing in coolant sub system 230.

The first control valve 262 may be positioned along a bypass path 280 that may be positioned between the intermediate heat exchanger 242 and the first expansion device 264. The bypass path 280 may permit some refrigerant to bypass the first expansion device 264 and the exterior heat exchanger 266 and flow to the internal heat exchanger 278 (if provided), the second expansion device 274, and the interior heat exchanger 276 when the first control valve 262 is open. The first control valve 262 may be closed to inhibit the flow of refrigerant through the bypass path 280 to the interior heat exchanger 276 when in heating mode.

The first expansion device 264 may be positioned between and may be in fluidic communication with intermediate heat exchanger 242 and the exterior heat exchanger 266. The first expansion device 264 may be provided to change the pressure of the refrigerant. For example, the first expansion device 264 may be a thermal expansion valve (TXV) or a fixed or variable position valve that may or may not be externally controlled. The first expansion device 264 may reduce the pressure of the refrigerant that passes through the first expansion device 264 from the intermediate heat exchanger 242 to the exterior heat exchanger 266. Therefore, high pressure refrigerant received from the intermediate heat exchanger 242 may exit the first expansion device 264 at a lower pressure and as a liquid and vapor mixture in the heating mode.

The exterior heat exchanger 266 may be positioned outside the passenger compartment 120. In a cooling mode or air conditioning context, the exterior heat exchanger 266 may function as a condenser and may transfer heat to the surrounding environment to condense the refrigerant from a vapor to a liquid. In a heating mode, the exterior heat exchanger 266 may function as an evaporator and may transfer heat from the surrounding environment to the refrigerant, thereby causing the refrigerant to vaporize.

The second control valve 268 may be positioned between the exterior heat exchanger 266 and the bypass path 280. The second control valve 268 may be a check valve and it may inhibit the flow of refrigerant from the bypass path 280 to the exterior heat exchanger 266. As such, refrigerant exiting the exterior heat exchanger 266 when the climate control system 224 is in the heating mode may be routed to the third control valve 270.

A third control valve 270 may be positioned between the exterior heat exchanger 266 and the accumulator 272. The third control valve 270 may help control the flow of refrigerant that exits the exterior heat exchanger 266. In the heating mode, the third control valve 270 may be open to permit refrigerant to flow from the exterior heat exchanger 266 to the accumulator 272. The third control valve 270 may be closed and the second expansion device 274 may be opened in other modes, such as a cooling mode.

The accumulator 272 may act as a reservoir for storing any residual liquid refrigerant so that vapor refrigerant rather than liquid refrigerant may be provided to the pump 260. The accumulator 272 may include a desiccant that absorbs small amounts of water moisture from the refrigerant.

The second expansion device 274 may be positioned between and may be in fluidic communication to the exterior heat exchanger 266 and the interior heat exchanger 276. The second expansion device 274 may have a similar structure as the first expansion device 264 and may be provided to change the pressure of the refrigerant similar to the first expansion device 264. In addition, the second expansion device 274 may be closed to inhibit the flow of refrigerant. More specifically, the second expansion device 274 may be closed to inhibit the flow of refrigerant from the exterior heat exchanger 266 to the interior heat exchanger 276 in the heating mode. As such, closing the second expansion device 274 may inhibit the flow of refrigerant through the second control valve 268 to the internal heat exchanger 278 (if provided), as well as through the interior heat exchanger 276.

The interior heat exchanger 276 may be fluidly connected to the second expansion device 274. The interior heat exchanger 276 may be positioned inside the passenger compartment 120. In a cooling mode or air conditioning context, the interior heat exchanger 276 may function as an evaporator and may receive heat from air in the passenger compartment 120 to vaporize the refrigerant. Refrigerant exiting the interior heat exchanger 276 may be routed to the accumulator 272. In the heating mode, refrigerant may not be routed to the interior heat exchanger 276 due to the closure of the second expansion device 274.

The internal heat exchanger 278, if provided, may transfer thermal energy between refrigerant flowing through different regions of the heat pump subsystem 232. The internal heat exchanger 278 may be positioned outside the passenger compartment 120. In a cooling mode or air conditioning context, heat may be transferred from refrigerant that is routed from the exterior or exterior heat exchanger 266 to the interior heat exchanger 276 to refrigerant that is routed from the accumulator 272 to the pump 260. In the heating mode, the internal heat exchanger 278 does not transfer thermal energy between such refrigerant flow paths since the second expansion device 274 is closed, thereby inhibiting the flow of refrigerant through a portion of the internal heat exchanger 278.

The ventilation subsystem 234 may circulate air in the passenger compartment 120 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 120. For example, the housing 290 or a portion thereof may be positioned under an instrument panel of the vehicle 10. The housing 290 may have an air intake portion 200 that may receive air from outside the vehicle 10 and/or air from inside the passenger compartment 120. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air from inside the passenger compartment 120 and recirculate such air through the ventilation subsystem 234. One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 120. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 120. The temperature door 294 may be moved between a plurality of positions to provide air having a desired temperature. In FIG. 2, the temperature door 294 is shown in a full heat position in which airflow is directed through the heater core 244.

At times, it may be possible for ice to develop on fins 285 of exterior heat exchanger 266 during heating mode since thermal energy in ambient air is being transferred to expanding refrigerant which cools fins 285. Consequently, it may be desirable for heat pump subsystem 232 to enter a de-icing mode. During de-icing mode first expansion device 264 may be adjusted (e.g., fully opened) so that a small pressure drop occurs across first expansion device 264. Further, second expansion device 274 is closed so that refrigerant does not pass through interior heat exchanger 276 and valve 262 is also closed. Compressor 260 increases temperature of refrigerant as it compresses the refrigerant and its output may be increased. The heated refrigerant is directed through exterior heat exchanger 266, thereby warming exterior heat exchanger 266 to de-ice coils. The heated refrigerant is returned to compressor 260 after the refrigerant flows through accumulator 272 and internal heat exchanger 278. Refrigerant PTC heater 267 may be selectively activated during de-icing mode to reduce the amount of time it takes to de-ice exterior heat exchanger 266. Refrigerant PTC heater 267 transfers heat to the refrigerant without having to first transfer heat to the engine coolant. Additionally, coolant pump 254 may be deactivated in de-icing mode so that heat in the refrigerant is not transferred to the coolant loop 230 if the passenger cabin is within a predetermined temperature of a desired temperature. On the other hand, coolant pump 254 may be activated along with PTC heater 265 in de-icing mode so heat may be provided to the passenger cabin while reducing heat transferred to engine coolant from refrigerant if the passenger cabin is not within a predetermined temperature of the desired temperature.

Figure 4:
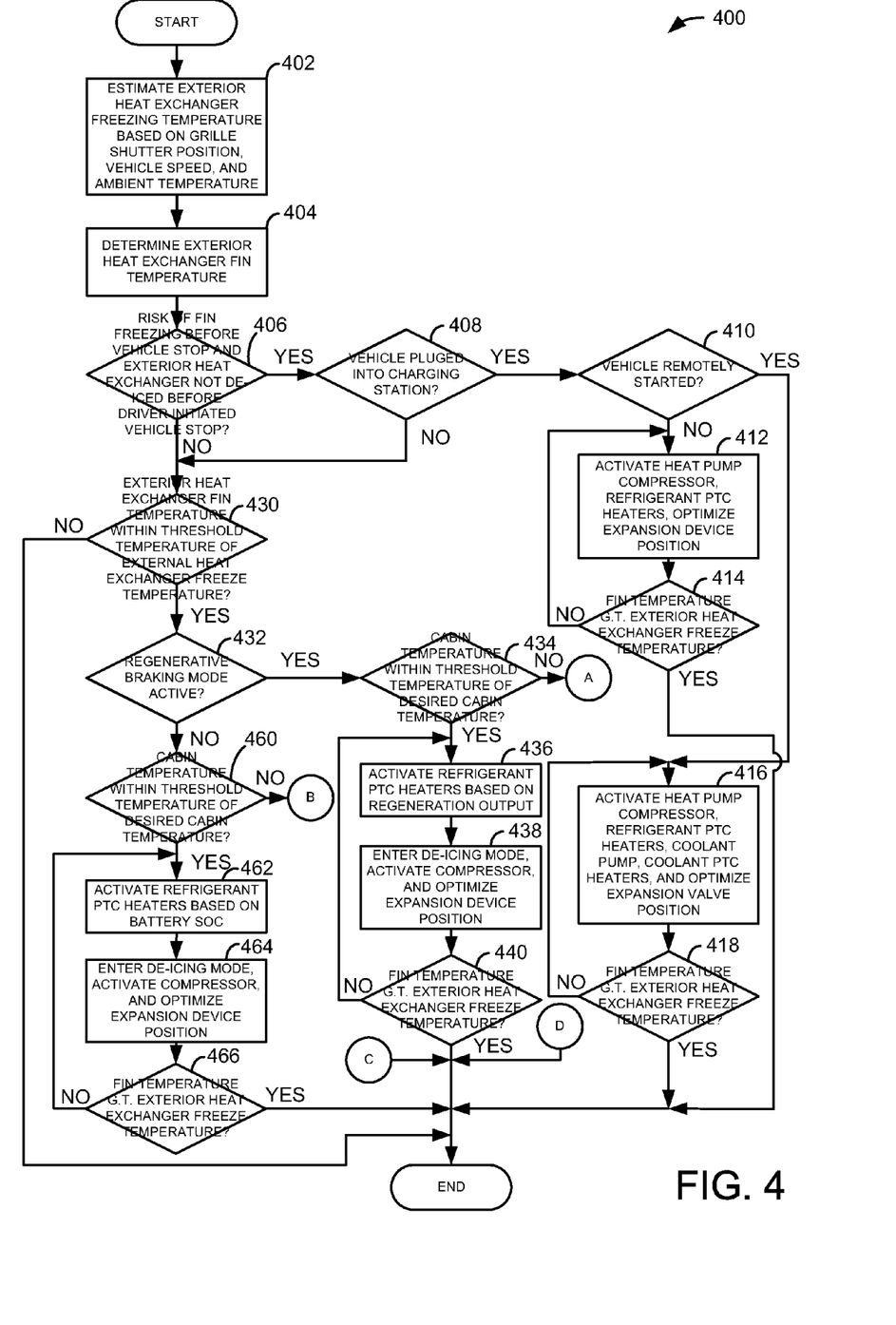
FIGS. 4 and 5 show a method for operating a vehicle heating system.

Controller 212 includes executable instructions of the method in FIG. 4 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 4.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 304, such as a fuel injector, throttle, camshaft, etc.

An engine output torque may be transmitted to driveline disconnect clutch 305. Driveline disconnect clutch selectively couples and decouples driveline 300. Driveline disconnect clutch 305 may be electrically or hydraulically actuated. The downstream side of driveline disconnect clutch 305 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300. Electrical energy storage device 11 may be a battery, capacitor, or inductor. The downstream side of DISG 14 is mechanically coupled to transmission 308.

Electric energy storage device 11 may also be recharged via a stationary charging station 380 which may be external to vehicle 10 and electrically connected to power grid 381. Stationary changing station 380 may reduce or increase voltage supplied by grid 381 to charge electric energy storage device 11. Further, stationary charging station 380 may provide power to PTC heater 267 and compressor 260 in response to outside evaporator icing when vehicle 10 is stopped and not being operated by a driver.

Automatic transmission 308 includes gear clutches (e.g., gears 1-6) 333 for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 212 may apply engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art. Controller 212 may also start engine 12 in response to a signal provided by remote transmitter 382 and received via receiving antenna 385.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 301.

It should be noted that the system of FIGS. 1-3 may be operated with a variety of different refrigerants without departing from the scope or breadth of this disclosure. For example, the system may use $CO_2$ as a refrigerant. If $CO_2$ is used as the refrigerant, several modifications may be required including replacing refrigerant to coolant heat exchanger 242 with a refrigerant to coolant gas cooler, adding an oil separator to the output of compressor 260, and operating exterior heat exchanger 266 as a gas cooler in cooling mode and as an evaporator in heating mode.

The system of FIGS. 1-3 provides for a vehicle system, comprising: an exterior heat exchanger; a refrigerant to engine coolant heat exchanger in fluidic communication with the exterior heat exchanger; a first positive temperature coefficient (PTC) heater on a refrigerant side of the refrigerant to engine coolant heat exchanger; and a controller including executable instructions stored in non-transitory memory to activate the first PTC heater in response to icing of the exterior heat exchanger. The vehicle system includes where the first PTC heater supplies thermal energy to a refrigerant that passes through the exterior heat exchanger. The vehicle system further comprises a second PTC heater on an engine coolant side of the refrigerant to engine coolant heat exchanger. The vehicle system further comprises additional executable instructions stored in the non-transitory memory for adjusting current supplied to the first PTC heater in response to battery state of charge.

In some examples, the vehicle system further comprises additional executable instructions stored in the non-transitory memory for adjusting current supplied to the first PTC heater in response to a condition of regenerative braking. The vehicle system further comprises additional executable instructions stored in the non-transitory memory for entering a heat pump de-icing mode where an expansion valve positioned along a refrigerant conduit upstream of the exterior heat exchanger is fully open.

Referring now to FIG. 4, a flowchart of a method for de-icing an exterior or exterior heat exchanger of a vehicle heat pump is shown. The method of FIGS. 4 and 5 may be stored as executable instructions non-transitory memory in the system of FIGS. 1-3. Further, the method of FIGS. 4 and 5 may provide the operating sequence shown in FIG. 5.

At 402, method 400 estimates exterior heat exchanger freezing temperature based on grille shutter position, ambient temperature, and vehicle speed. The exterior heat exchanger freezing temperature may be a temperature at which fins of the exterior heat exchanger begin to freeze. In one example, the exterior heat exchanger temperature may be estimated from tables or functions that hold empirically determined temperature values corresponding to exterior heat exchanger freezing temperature. A base exterior heat exchanger freezing temperature may be based on compressor outlet pressure and expansion valve 264 operating position. Additional tables or functions that hold empirically determined exterior heat exchanger freezing temperature factors or adders based on vehicle speed, grille shutter position, and ambient temperature modify or adjust the base exterior heat exchanger freezing temperature to provide an exterior heat exchanger freezing temperature. Method 400 proceeds to 404 after exterior heat exchanger freezing temperature is determined.

At 404, method 400 determines exterior heat exchanger fin temperature. Exterior heat exchanger fin temperature may be estimated based on vehicle operating conditions or measured via a temperature sensor. Method 400 proceeds to 406 after the exterior heat exchanger fin temperature is determined.

At 406, method 400 judges whether or not a risk of exterior heat exchanger fin freezing was present before a vehicle was stopped and parked, and if the exterior heat exchanger was not de-iced in response to an indication of exterior heat exchanger freezing before the vehicle was stopped and parked. A bit in memory may be used to indicate whether or not exterior heat exchanger freezing is present or not present. In one example, if the exterior heat exchanger is less than or within a predetermined temperature of the exterior heat exchanger freezing temperature determined at 402, the bit is assigned a value of one to indicate the possibility of exterior heat exchanger freezing. If exterior heat exchanger freezing is indicated and the vehicle is parked without entering a de-icing mode, the answer is yes and method 400 proceeds to 408. Otherwise, the answer is no and method 400 proceeds to 430.

At 408, method 400 judges whether or not vehicle 10 is plugged into or electrically coupled to a charging station. The charging station may be in electrical communication with a power grid and located at a home or at a business. In one example, method 400 may judge that vehicle 10 is in electrical communication with a charging station via measuring a voltage at a charging input. If method 400 judges that vehicle 10 is in electrical communication or electrically coupled to a charging station, the answer is yes and method 400 proceeds to 410. Otherwise, the answer is no and method 400 proceeds to 430.

At 410, method 400 judges whether or not the vehicle is being or has been remotely started. In one example, a bit in memory may be set to a value of one if a signal to start the vehicle has been received from a remote transmitter. The bit may be reset to a value of zero once the vehicle is driven. In response to a remote start, heat pump subsystem 232 may be activated to begin heating or cooling passenger cabin 120. During a remote start, the vehicle's engine and/or motor may or may not be activated since the heat pump may be activated (e.g., compressor 260, controller 212, and assorted valves may be activated) using power from the stationary power source. In some examples, method 400 does not activate the engine and/motor until the driver opens the vehicle's door. For example, if vehicle 10 is remotely started via a transmitter 382, heat pump subsystem 232 may be activated until the driver electrically decouples vehicle 10 from stationary charging station 380 or opens vehicle door 135. If method 400 judges that vehicle 10 has been remotely started, the answer is yes and method 400 proceeds to 416. Otherwise, the answer is no and method 400 proceeds to 412.

At 412, method 400 activates the heat pump compressor 260, refrigerant PTC heater 267, and optimizes a valve position of expansion device 264. The heat pump subsystem 232 is activated in a de-icing mode. The amount of current supplied to the refrigerant PTC heater 267 and compressor 260 may be based on the amount of current available from the stationary charging station 380. However, if the exterior heat exchanger 266 has been de-iced once while the vehicle is stopped, the compressor 260 and the refrigerant PTC heater are not activated. In one example, the valve position of expansion device 264 is optimized by adjusting a position of expansion device 264 in response to feedback from a temperature sensor at exterior heat exchanger 266. Method 400 proceeds to 414.

At 414, method 400 judges whether or not exterior heat exchanger fin temperature is greater than exterior heat exchanger freeze temperature determined at 402 by more than a threshold temperature. If exterior heat exchanger fin temperature is greater than exterior heat exchanger temperature by more than a threshold temperature, it may be determined that exterior heat exchanger 266 is de-iced. If method 400 judges that exterior heat exchanger fin temperature is greater than the exterior heat exchanger freeze temperature, the answer is yes and method 400 proceeds to exit. Otherwise, the answer is no and method 400 returns to 412.

At 416, method 400 activates the heat pump compressor 260, refrigerant PTC heater 267, coolant pump 254, engine coolant PTC heaters 265 and optimizes expansion device 264 valve position for maximum heat transfer to the exterior heat exchanger. The heat pump subsystem 232 is activated in a de-icing mode. The amount of current supplied to the refrigerant PTC heater 267 and compressor 260 may be based on the amount of current available from the stationary charging station 380. However, if the exterior heat exchanger 266 has been de-iced once while the vehicle is stopped, the compressor 260 and the refrigerant PTC heater are not activated. The engine coolant PTC heaters 265 are activated to warm the engine coolant. Further, coolant pump 254 may be activated along with fan 292 to warm the passenger cabin via the engine coolant PTC heater 265. The expansion device valve position may be optimized by adjusting expansion device valve position in response to a temperature of the exterior heat exchanger 266. Method 400 proceeds to 418.

At 418, method 400 judges whether or not exterior heat exchanger fin temperature is greater than exterior heat exchanger freeze temperature determined at 402 by more than a threshold temperature. If exterior heat exchanger fin temperature is greater than exterior heat exchanger freeze temperature by more than a threshold temperature, it may be determined that exterior heat exchanger 266 is de-iced. If the exterior heat exchanger is de-iced, the heat pump subsystem 232 exits de-icing mode, compressor 260 is deactivated, and refrigerant PTC heater 267 is deactivated. If method 400 judges that exterior heat exchanger fin temperature is greater than the exterior heat exchanger freeze temperature, the answer is yes and method 400 proceeds to exit. Otherwise, the answer is no and method 400 returns to 416.

At 430, method 400 judges whether or not the exterior heat exchanger 266 fin temperature is less than or within a threshold temperature of the exterior heat exchanger freeze temperature determined at 402. In one example, the exterior heat exchanger freeze temperature determined at 402 is subtracted from the fin temperature determined at 404. If the result is less than zero or less than a threshold temperature, the answer is yes and method 400 proceeds to 432. Otherwise, the answer is no and method 400 proceeds to exit.

At 432, method 400 judges whether or not vehicle 10 is in a regenerative braking mode. Vehicle 10 may be judged to be in a regenerative braking mode when electric machine 14 is outputting electrical power to electric energy storage device 11. If method 400 judges that vehicle 10 is in a regenerative braking mode, the answer is yes and method 400 proceeds to 434. Otherwise, the answer is no and method 400 proceeds to 460.

At 434, method 400 judges whether or not vehicle cabin temperature is within a threshold temperature of a desired cabin temperature. In one example, cabin temperature determined from a cabin temperature sensor is subtracted from a desired cabin temperature. If the result is less than zero or within a predetermined temperature, the answer is yes and method 400 proceeds to 436. Otherwise, the answer is no and method 400 proceeds to 450.

At 436, method 400 activates refrigerant PTC heater 267 based on output of electric machine 14 in regenerative braking mode (e.g., slowing the vehicle via operating electric machine 14 as a generator and converting the vehicle's kinetic energy into electrical energy). For example, if electric machine is outputting 5000 watts, refrigerant PTC heater 267 may be allocated a percentage of electric machine output depending on the state of charge of electric energy storage device 11. The percentage of electric machine output allocated to the refrigerant PTC heater 267 increasing as the state of charge of electric energy storage device increases. For example, if battery state of charge is 90% of full capacity, refrigerant PTC heater may be allocated 95% of power output by electric machine 14 during regenerative braking mode. However, if battery state of charge is 10% of full capacity, refrigerant PTC heater may be allocated 40% of power output by electric machine 14 during regenerative braking mode. Method 400 proceeds to 438 after refrigerant PTC heater 267 is activated.

At 438, method 400 transitions heat pump subsystem 232 into de-icing mode. In de-icing mode where cabin temperature is near a desired temperature, compressor 260 is activated, a position of expansion valve 264 is optimized, valve 262 is closed, and valve 270 is open. In one example, the valve position of expansion device 264 is optimized by adjusting a position of expansion device 264 in response to feedback from a temperature sensor at exterior heat exchanger 266. Method 400 proceeds to 440 after heat pump subsystem 232 enters de-icing mode.

At 440, method 400 judges whether or not exterior heat exchanger fin temperature is greater than exterior heat exchanger freeze temperature determined at 402 by more than a threshold temperature. If exterior heat exchanger fin temperature is greater than exterior heat exchanger freeze temperature by more than a threshold temperature, it may be determined that exterior heat exchanger 266 is de-iced. If the exterior heat exchanger is de-iced, the heat pump subsystem 232 exits de-icing mode, compressor 260 is deactivated, and refrigerant PTC heater 267 is deactivated. If method 400 judges that exterior heat exchanger fin temperature is greater than the exterior heat exchanger freeze temperature, the answer is yes and method 400 proceeds to exit. Otherwise, the answer is no and method 400 returns to 436.

At 450, method 400 activates refrigerant PTC heater 267 and engine coolant PTC heater 265 based on output of electric machine 14 in regenerative braking mode. For example, if electric machine is outputting 5000 watts, refrigerant PTC heater 267 and engine coolant PTC heater 265 may be allocated a percentage of electric machine output depending on the state of charge of electric energy storage device 11. The percentage of electric machine output allocated to the refrigerant PTC heater 267 and engine coolant PTC heater 265 increases as the state of charge of electric energy storage device increases. For example, if battery state of charge is 90% of full capacity, refrigerant PTC heater 267 and engine coolant PTC heater 265 may be allocated 95% of power output by electric machine 14 during regenerative braking mode. However, if battery state of charge is 10% of full capacity, refrigerant PTC heater 267 and engine coolant PTC heater 265 may be allocated 40% of power output by electric machine 14 during regenerative braking mode. Method 400 proceeds to 452 after refrigerant PTC heater 267 and engine coolant PTC heater 265 are activated.

At 452, method 400 transitions heat pump subsystem 232 into de-icing mode. In de-icing mode where cabin temperature is not near desired temperature, compressor 260 is activated, coolant pump 254 is activated, expansion valve 264 is adjusted to optimize heat transfer to the exterior heat exchanger 266, valve 262 is closed, and valve 270 is open. In one example, a position of expansion valve 264 is optimized by adjusting expansion valve position in response to a temperature of exterior heat exchanger 266. Method 400 proceeds to 454 after heat pump subsystem 232 enters de-icing mode.

At 454, method 400 judges whether or not exterior heat exchanger fin temperature is greater than exterior heat exchanger freeze temperature determined at 402 by more than a threshold temperature. If exterior heat exchanger fin temperature is greater than exterior heat exchanger freeze temperature by more than a threshold temperature, it may be determined that exterior heat exchanger 266 is de-iced. If the exterior heat exchanger is de-iced, the heat pump subsystem 232 exits de-icing mode, compressor 260 is deactivated, coolant pump 254 is deactivated, and refrigerant PTC heater 267 and engine coolant PTC heater 265 are deactivated. If method 400 judges that exterior heat exchanger fin temperature is greater than the exterior heat exchanger freeze temperature, the answer is yes and method 400 proceeds to exit. Otherwise, the answer is no and method 400 returns to 450.

At 460, method 400 judges whether or not vehicle cabin temperature is within a threshold temperature of a desired cabin temperature. In one example, cabin temperature determined from a cabin temperature sensor is subtracted from a desired cabin temperature. If the result is less than zero or within a predetermined temperature, the answer is yes and method 400 proceeds to 462. Otherwise, the answer is no and method 400 proceeds to 470.

At 470, method 400 activates refrigerant PTC heater 267 and engine coolant PTC heater 265 based on battery state of charge (e.g., a percentage of the electric energy storage device's full charge capacity). For example, if battery state of charge is 90% of full charge capacity, refrigerant PTC heater 267 and engine coolant PTC heater 265 may be allocated a predetermined number of watts from the battery or electric energy storage device 11. The wattage allocated to the refrigerant PTC heater 267 and engine coolant PTC heater 265 increases as the state of charge of electric energy storage device increases. For example, if battery state of charge is 90% of full capacity, refrigerant PTC heater 267 and engine coolant PTC heater 265 may be allocated 200 watts of power output by electric energy storage device 11. However, if battery state of charge is 40% of full capacity, refrigerant PTC heater 267 and engine coolant PTC heater 265 may be allocated 50 watts of power output by electric energy storage device 11. Method 400 proceeds to 472 after refrigerant PTC heater 267 and engine coolant PTC heater 265 are activated.

At 472, method 400 transitions heat pump subsystem 232 into de-icing mode. In de-icing mode where cabin temperature is not near a desired temperature, compressor 260 is activated, a position of expansion valve 264 is optimized, coolant pump 254 is activated, valve 262 is closed, and valve 270 is open. Method 400 proceeds to 474 after heat pump subsystem 232 enters de-icing mode.

At 474, method 400 judges whether or not exterior heat exchanger fin temperature is greater than exterior heat exchanger freeze temperature determined at 402 by more than a threshold temperature. If exterior heat exchanger fin temperature is greater than exterior heat exchanger freeze temperature by more than a threshold temperature, it may be determined that exterior heat exchanger 266 is de-iced. If the exterior heat exchanger is de-iced, the heat pump subsystem 232 exits de-icing mode, compressor 260 is deactivated, coolant pump 254 is deactivated, and refrigerant PTC heater 267 and engine coolant PTC heater 265 are deactivated. If method 400 judges that exterior heat exchanger fin temperature is greater than the exterior heat exchanger freeze temperature, the answer is yes and method 400 proceeds to exit. Otherwise, the answer is no and method 400 returns to 470.

At 462, method 400 activates refrigerant PTC heater 267 based on battery state of charge. For example, if battery state of charge is 90% of full charge capacity, refrigerant PTC heater 267 may be allocated a predetermined number of watts from the battery or electric energy storage device 11. The wattage allocated to the refrigerant PTC heater 267 increases as the state of charge of electric energy storage device increases. For example, if battery state of charge is 90% of full capacity, refrigerant PTC heater 267 may be allocated 200 watts of power output by electric energy storage device 11. However, if battery state of charge is 40% of full capacity, refrigerant PTC heater 267 may be allocated 50 watts of power output by electric energy storage device 11. Method 400 proceeds to 464 after refrigerant PTC heater 267 is activated.

At 464, method 400 transitions heat pump subsystem 232 into de-icing mode. In de-icing mode where cabin temperature is near a desired temperature, compressor 260 is activated, a position of expansion valve 264 is optimized, valve 262 is closed, and valve 270 is open. In one example, the valve position of expansion device 264 is optimized by adjusting a position of expansion device 264 in response to feedback from a temperature sensor at exterior heat exchanger 266. Method 400 proceeds to 466 after heat pump subsystem 232 enters de-icing mode.

At 466, method 400 judges whether or not exterior heat exchanger fin temperature is greater than exterior heat exchanger freeze temperature determined at 402 by more than a threshold temperature. If exterior heat exchanger fin temperature is greater than exterior heat exchanger temperature by more than a threshold temperature, it may be determined that exterior heat exchanger 266 is de-iced. If the exterior heat exchanger is de-iced, the heat pump subsystem 232 exits de-icing mode, compressor 260 is deactivated, and refrigerant PTC heater 267 is deactivated. If method 400 judges that exterior heat exchanger fin temperature is greater than the exterior heat exchanger freeze temperature, the answer is yes and method 400 proceeds to exit. Otherwise, the answer is no and method 400 returns to 462.

Thus, the method of FIGS. 4 and 5 provides for selectively activating and deactivating refrigerant PTC heaters and engine coolant PTC heaters to de-ice exterior heat exchanger 266 and warm passenger compartment 120. In this way, exterior heat exchanger de-icing may be improved. Additionally, in some examples, if the engine is operating and the exterior heat exchanger is determined to be iced, heat may be transferred from the engine to the exterior heat exchanger via intermediate heat exchanger 242. The compressor is activated to provide motive force to transfer heat from intermediate heat exchanger 242 to exterior heat exchanger 266.

Referring now to FIG. 6, a simulated example sequence for operating a vehicle heating system according to the method of FIGS. 4 and 5 is shown. The vehicle heating system may be configured as is shown in FIGS. 1-3. Vertical lines at time T0-T4 indicate times of interest in the operating sequence.

The first plot from the top of FIG. 6 is a plot of refrigerant PTC heater 267 current versus time. The X axis represents time and time increases from the left side of FIG. 6 to the right side of FIG. 6. The Y axis represents current supplied to the refrigerant PTC heater 267 and current increases in the direction of the Y axis arrow.

The second plot from the top of FIG. 6 is a plot of engine coolant PTC heater 265 current versus time. The X axis represents time and time increases from the left side of FIG. 6 to the right side of FIG. 6. The Y axis represents current supplied to the engine coolant PTC heater 265 and current increases in the direction of the Y axis arrow.

The third plot from the top of FIG. 6 is a plot of passenger compartment temperature versus time. The X axis represents time and time increases from the left side of FIG. 6 to the right side of FIG. 6. The Y axis represents passenger compartment temperature and temperature increases in the direction of the Y axis arrow. Horizontal line 601 represents a desired passenger compartment temperature.

The fourth plot from the top of FIG. 6 is a plot of exterior heat exchanger 266 freezing indication versus time. The X axis represents time and time increases from the left side of FIG. 6 to the right side of FIG. 6. The Y axis represents exterior heat exchanger 266 freezing indication and a freezing condition is indicated by the trace being at a higher level near the Y axis arrow. Exterior heat exchanger 266 freezing is not indicated when the trace is at a lower level near the X axis.

At time T0 the refrigerant PTC heater and the engine coolant PTC heater are not activated. The passenger compartment temperature is increasing indicating that the heat pump subsystem is in a heating mode (not shown). The exterior heat exchanger freeze indication is not asserted.

Between time T0 and time T1, the passenger compartment temperature continues to increase and conditions in the remaining plots remain constant. The passenger compartment temperature increases as the heat pump subsystem adds heat to engine coolant (not shown).

At time T1, the exterior freeze indication is asserted in response to exterior heat exchanger fin temperature being within a threshold temperature of an estimated exterior heat exchanger freeze temperature. Because passenger compartment temperature is less than the desired passenger compartment temperature, both the refrigerant PTC heater 267 and the engine coolant PTC heater 265 are activated. Further, the battery state of charge (not shown) is at a higher level. Therefore, refrigerant PTC heater 267 and the engine coolant PTC heater 265 are supplied a greater amount of electrical current. Additionally, the heat pump system enters a de-icing mode where compressor 260 is activated, coolant pump 254 is activated, expansion valve 264 is adjusted to optimize heat transfer to the exterior heat exchanger 266, valve 262 is closed, and valve 270 is open (all not shown).

At time T2, the exterior freeze indication is not asserted in response to exterior heat exchanger fin temperature being greater than a threshold temperature away from the estimated exterior heat exchanger freeze temperature. The exterior heat exchanger fin temperature has been raised by entering de-icing mode and by thermal energy released by the refrigerant PTC heater. Since the exterior heat exchanger freeze indication is no longer asserted, the heat pump subsystem exits de-icing mode and current supplied to both the refrigerant PTC heater and the engine coolant PTC heater is ceased. The passenger compartment temperature remains below the desired passenger compartment temperature 601.

Between time T2 and time T3, the passenger compartment temperature continues to increase and conditions in the remaining plots remain constant. The passenger compartment temperature increases as the heat pump subsystem adds heat to engine coolant (not shown).

At time T3, the exterior freeze indication is asserted in response to exterior heat exchanger fin temperature being within a threshold temperature of an estimated exterior heat exchanger freeze temperature. Because passenger compartment temperature is greater than the desired passenger compartment temperature, only the refrigerant PTC heater 267 is activated. Further, the battery state of charge (not shown) is at a lower level. Therefore, refrigerant PTC heater 267 is supplied a lesser amount of electrical current as compared to the current supplied at time T1. The heat pump system also enters a de-icing mode where compressor 260 is activated, a position of expansion valve 264 is optimized, valve 262 is closed, and valve 270 is open and the coolant pump 254 is deactivated.

At time T4, the exterior freeze indication is not asserted in response to exterior heat exchanger fin temperature being greater than a threshold temperature away from the estimated exterior heat exchanger freeze temperature. The exterior heat exchanger fin temperature has been raised by entering de-icing mode and by thermal energy released by the refrigerant PTC heater 267. Since the exterior heat exchanger freeze indication is no longer asserted, the heat pump subsystem exits de-icing mode and current supplied to the refrigerant PTC heater is ceased. The passenger compartment temperature remains above the desired passenger compartment temperature 601.

Thus, current supplied to PTC heaters may be adjusted responsive to battery state of charge, passenger compartment temperature, and an indication of exterior heat exchanger freezing. Additionally, the expansion valve opening amount may be adjusted responsive to feedback from a temperature sensor at the exterior heat exchanger 266 and the indication of exterior heat exchanger freezing.

Thus, the method of FIGS. 4 and 5 provides for a method for thawing a vehicle's exterior heat exchanger, comprising: increasing an opening amount of an expansion valve located along a passage between a compressor and an exterior heat exchanger in response to exterior heat exchanger icing; and activating a first positive temperature coefficient (PTC) heater in response to the exterior heat exchanger icing, the PTC heater in thermal communication with refrigerant passing through the expansion valve. The method includes where the PTC heater is incorporated into a refrigerant to engine coolant heat exchanger. The method further comprises increasing output of a compressor in response to the indication of exterior heat exchanger icing.

In some examples, the method further comprises activating a second PTC heater in response to the indication of exterior heat exchanger icing. The method includes where the second PTC heater is incorporated into a refrigerant to engine coolant heat exchanger and where the second PTC heater transfers heat to engine coolant without having to first transfer heat to the refrigerant. The method includes where the first PTC heater transfers heat to the refrigerant without having to first transfer heat to the engine coolant. The method includes where the exterior heat exchanger is part of a heat pump, and where the heat pump is in a heating mode prior to increasing the opening amount of the expansion valve.

Additionally, the method of FIGS. 4 and 5 provides for a method for thawing a vehicle's exterior heat exchanger, comprising: supplying a first current to a first positive temperature coefficient heater (PTC) in response to exterior heat exchanger icing and a vehicle not being in a regenerative braking mode, the PTC heater in thermal communication with refrigerant passing through an expansion valve; and supplying a second current to the first PTC heater in response to exterior heat exchanger icing and the vehicle being in the regenerative braking mode. The method further comprises supplying a first current to a second PTC heater in response to exterior heat exchanger icing and the vehicle not being in the regenerative braking mode, and supplying a second current to the second PTC heater in response to exterior heat exchanger icing and the vehicle being in the regenerative braking mode, the first current less than the second current.

In some examples, the method further comprises supplying a third current to the first PTC heater in response to a vehicle being electrically coupled to a stationary charging system that is external the vehicle. The method further comprises adjusting the first current and the second current in response to battery state of charge. The method includes where the first current and the second current are increased as battery state of charge increases. The method includes where the first current and the second current are decreased as battery state of charge decreases. The method further comprises entering a de-icing mode where an expansion valve located along a refrigerant conduit between the vehicle's exterior heat exchanger and a compressor is fully opened.

As will be appreciated by one of ordinary skill in the art, methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for thawing a vehicle's exterior heat exchanger, comprising:
   supplying a first current to a first positive temperature coefficient heater (PTC) in response to exterior heat exchanger icing and a vehicle not being in a regenerative braking mode, the PTC heater in thermal communication with refrigerant passing through an expansion valve; and
   supplying a second current to the first PTC heater in response to exterior heat exchanger icing and the vehicle being in the regenerative braking mode, the first current less than the second current
   responsive to a cabin temperature not being within a threshold of a desired temperature, supplying a third current to a second PTC heater in response to exterior heat exchanger icing and the vehicle not being in the regenerative braking mode, and supplying a fourth current to the second PTC heater in response to exterior heat exchanger icing and the vehicle being in the regenerative braking mode, the third current less than the fourth current.

2. The method of claim 1, further comprising supplying a fifth current to the first PTC heater in response to the vehicle being electrically coupled to a stationary charging system that is external the vehicle.

3. The method of claim 1, further comprising adjusting the first current and the second current in response to a battery state of charge, wherein the second PTC heater is in thermal communication with a coolant passing through a heater core disposed in a passenger cabin.

4. The method of claim 3, where the first current and the second current are increased as the battery state of charge increases.

5. The method of claim 3, where the first current and the second current are decreased as the battery state of charge decreases.

6. The method of claim 1, further comprising entering a de-icing mode where the expansion valve is fully opened, the expansion valve being located along a refrigerant conduit between the vehicle's exterior heat exchanger and a compressor, and responsive to determining that the exterior heat exchanger icing is removed, exiting the de-icing mode and deactivating the first PTC heater.

* * * * *